Figure 1:
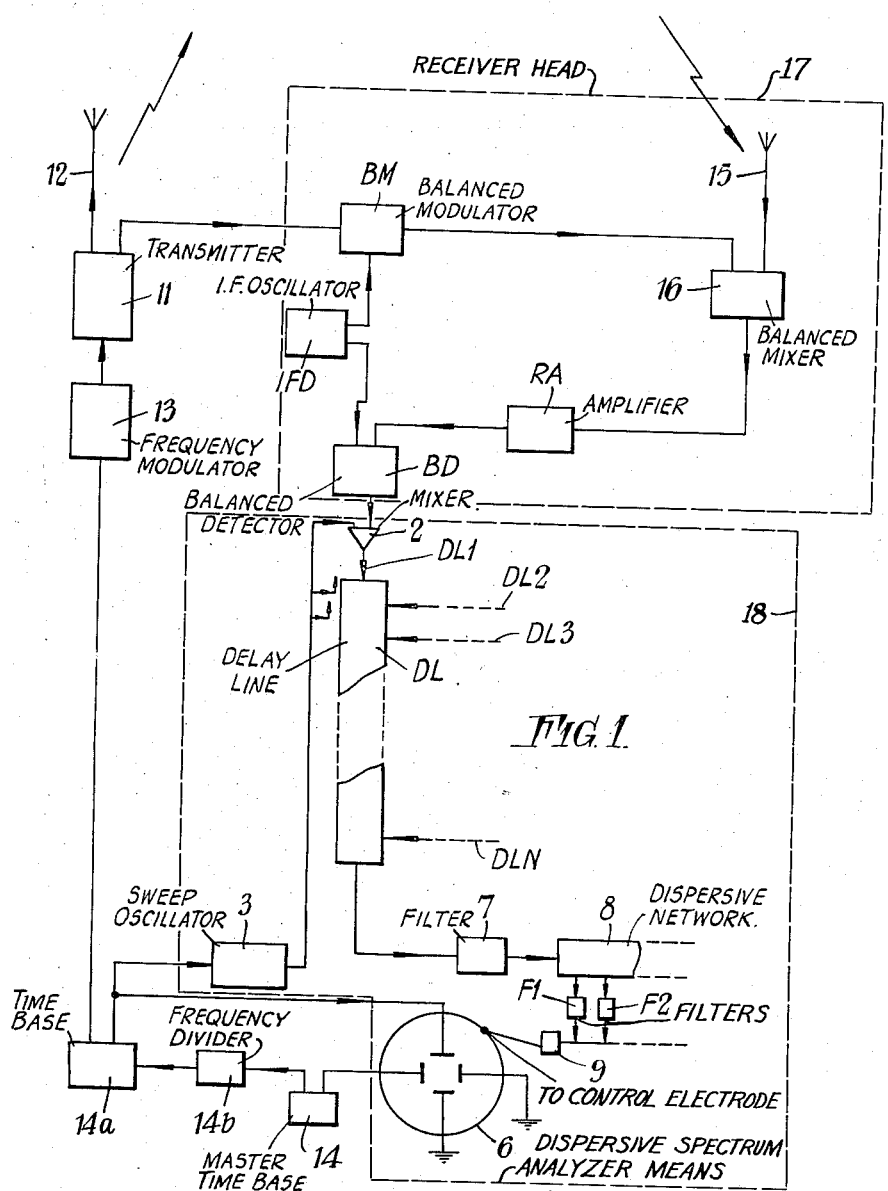

United States Patent Office

2,965,896
Patented Dec. 20, 1960

2,965,896

FREQUENCY MODULATED RADAR SYSTEM

Peter Maurice Wright and Percy Samuel Brandon, both of Green Gables 24, Chelmerton Ave., Chelmsford, England Filed Apr. 15, 1955, Ser. No. 501,752

2 Claims. (Cl. 343—17.5)

This application is a continuation-in-part of our co-pending application Serial No. 385998, filed October 14, 1953, now abandoned.

This invention relates to radar systems and more specifically to so-called frequency modulated (F.M.) Doppler frequency and similar radar systems of the kind in which received echo signals are converted into beat frequencies which lie within a predetermined band which has to be analyzed to separate the beat frequencies corresponding to the various targets from which the echo signals are reflected and thus to enable the said targets to be displayed on a cathode ray tube. In such systems frequency spectrum analyzers are required to separate the different beat frequencies for display purposes.

Broadly speaking there are two classes of radar system of the type in question in present day use. In the first class, usually called the "panoramic" class, the echo signals, or signals derived therefrom, are mixed with oscillations from a sweeping oscillator, the oscillations of which are frequency modulated (usually in accordance with a saw tooth law) and the signals resulting from mixing are fed to a band pass filter of fixed predetermined pass frequency and narrow predetermined band width. In effect, therefore, the combination of mixer and sweeping oscillator sweeps the incoming signal band (more accurately a band derived therefrom) across the pass band of the filter. The defect of this class of radar system is the time required to analyze the signal band.

In the second class of radar system of the type referred to, sometimes termed the multi-analyzer class, the whole band of signals or, in usual practice, a band derived therefrom by heterodyning, is fed to a plurality of separate filters of different, adjacent, pass bands, which between them cover the whole band, the more the number of filters provided the greater the resolution. In this class of system analysis is effected in the shortest possible time but there is the serious defect of complexity for the means necessary for displaying the separated signals resulting from analysis are considerably more complex than the comparatively simple means which are all that are necessary with the panoramic type of analyzer.

The present invention seeks to provide improved radar systems which will combine the main advantages of the two classes of system above referred to without their defects. More specifically the invention seeks to provide improved multi-head radar systems of the kind referred to—i.e. systems in which a volume to be "watched" is "covered" by a plurality of differently directed receiver heads each "covering" a different fraction of that volume—in which signals simultaneously received on all the heads are analyzed and then used for display in time sequence so that targets are displayed sequentially (though signals received therefrom may be handled simultaneously) in terms of azimuth and some other factor, principally (though not necessarily) range.

The present invention makes use of a newly conceived frequency spectrum analyzer which forms the subject of the invention contained in co-pending application No. 385,830 filed on October 13, 1953, now U.S. Patent No. 2,897,442, granted July 28, 1959. According to the invention contained in the said co-pending application a frequency spectrum analyzer comprises a mixer in which are mixed signals within a band of frequencies to be analyzed and locally generated oscillations from a frequency modulated sweeping oscillator having a frequency deviation preferably approximately equal to the width of said band, and a dispersive network fed with the output from said mixer and adapted to convert the frequency modulated trains which constitute said output into signal pulses or bursts of signals occurring at times dependent on the signal frequencies in said band. For the sake of brevity in description a frequency spectrum analyzer in accordance with the invention in said co-pending application will be termed hereinafter a "dispersive spectrum analyzing means."

According to this invention a radar system comprises at least one frequency modulated transmitter adapted to transmit continuous waves which are frequency modulated in accordance with a predetermined period law repeating itself at a predetermined repetition frequency, a plurality (N) of differently directed receiver heads, each covering a different portion of a volume in space to be "watched," a common delay line fed with the resultants of mixing signals derived from all said heads with outputs from sweep oscillator means arranged to sweep through N times the relevant beatnote frequency range thereof in one repetition period, said line delivering said resultants to a common output circuit with different delays for the different heads, the delays imposed on the resultants corresponding to adjacent heads differing by 1/Nth of the said repetition period, a dispersive network fed from said common output circuit, a cathode ray display tube, means for deflecting the ray in said tube in one direction at a frequency equal to said predetermined repetition frequency, means for deflecting the ray in said tube in another direction at a frequency equal to N times said predetermined repetition frequency, and means for applying signals derived from the dispersive network to control the intensity of the ray in said display tube, said dispersive network, sweep oscillator means and the means for mixing the signals from the heads with outputs from the oscillator means constituting dispersive spectrum analyzer means as indicated within the dotted line box 18.

Figure 2:
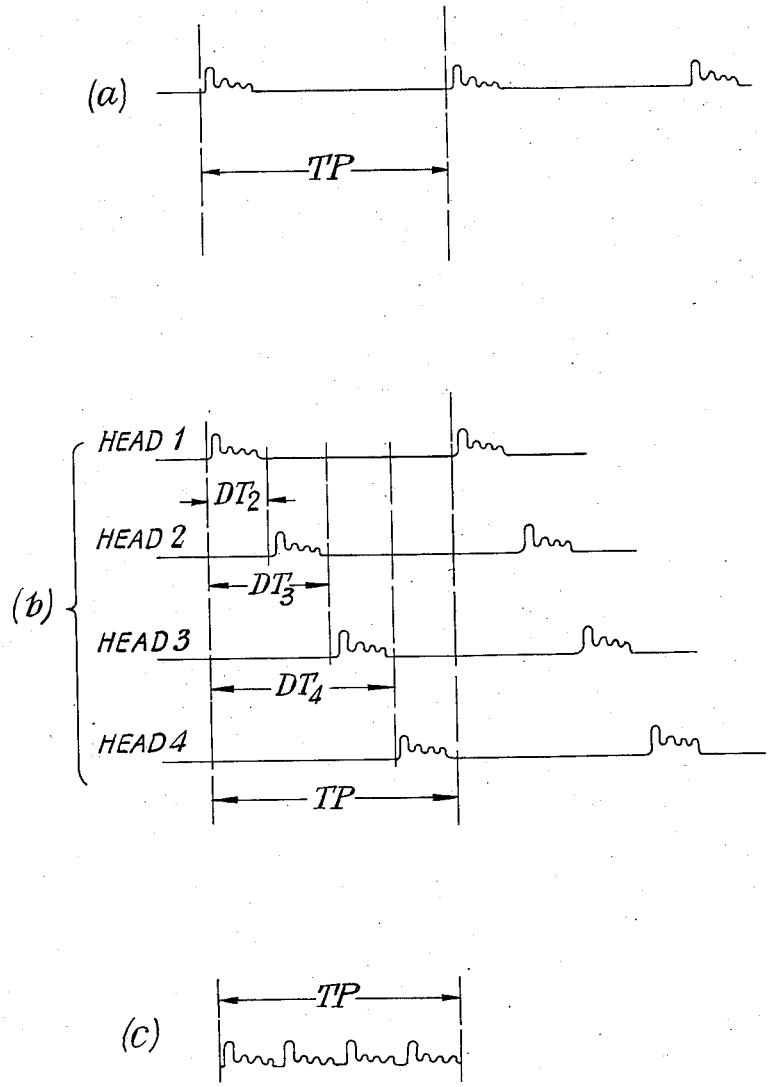

The invention is illustrated in the accompanying drawings, in which Fig. 1 is a block diagram of one embodiment and Fig. 2 is an explanatory graphical figure.

Fig. 1 shows diagrammatically one form of multi-head radar installation embodying the invention. For simplicity in drawing only one head is indicated, the connections of the others being similar to that shown. The system of Fig. 1 employs a spectrum analyzer in accordance with the invention contained in the co-pending application No. 385,830 filed on October 13, 1953, to analyze the beat notes to determine the range of targets, the frequency deviation of the sweeping oscillator being so chosen that range sweeping (i.e. searching in range up to the maximum range required) is effected in 1/Nth of the transmitter repetition period, N being the number of radar heads. The outputs of the heads after mixing with outputs from a sweep oscillator are combined in parallel by means of a delay line which delays the resultant corresponding to each head with relation to that of its neighbor by 1/Nth of the transmitter repetition period so that, in one complete period, there are N range sweeps, one for each head. Although, in the particular case now being described azimuth and range of targets are determined—azimuth from knowledge of the head in effective use at any time and range from range sweeping—it will be obvious later that the system to be described could easily be adapted to ascertain other target information, e.g. azimuth and altitude, or azimuth and elevation, range and velocity, azimuth and velocity, or range and elevation, for example.

Referring to Fig. 1, a so-called "flood-lighting" transmitting aerial 12 is fed from a transmitter 11 which is frequency modulated by a saw tooth modulator 13 which is controlled by a time base 14a at the required transmitter repetition frequency $f_r$ the transmitted frequency being varied between limiting frequencies such that the beat note range obtained is from $f_a$ to $f_b$ c./s. As shown this time base is driven by a frequency divider 14b which divides by the factor N (the number of receiving heads in the system) the output from a master time base 14 operating at N times the required repetition period.

The time base 14 consists of a sine wave oscillator, operating at a frequency of $Nf_r$, whose output is converted into square waves, in well known manner. The square waves are passed through a differentiating network and the derived negative going pulses are removed. The positive going pulses are then used to synchronize a conventional saw-tooth generator of the same frequency $Nf_r$. The said positive going pulses are also fed to the frequency divider 14b, which is a counter type of divider which is well-known per se, and the output therefrom, consisting of positive going pulses of frequency $f_r$, is used to synchronize time base 14a, which is also a conventional sawtooth generator.

Each of the N receiving heads (only one is shown) comprises a receiving aerial 15, a balanced mixer 16, a balanced modulator BM, an amplifier RA, a balanced detector BD and an intermediate frequency oscillator IFD. We have shown a typical receiving head enclosed in dotted lines 17 in the diagram of Fig. 1. The receiving heads are differently oriented in azimuth in the usual way in multi-head systems, e.g. there might be 50 heads each covering 1° of azimuth, the aerial 12 covering the whole 50°. The balanced mixer 16 receives one input from the aerial 15 and the other from the balanced modulator BM; the said modulator BM receives one input direct from the transmitter 11 and the other from the oscillator IFD; and the balanced detector BD receives one input from said oscillator IFD and the other from the amplifier RA which is fed from the mixer 16. As so far described the system is as known.

The balanced mixer 16 receives energy from the balanced modulator BM as the result of the balancing modulation process involving the voltage at the frequency Fo (the transmitting frequency) and the voltage from the IF oscillator Fi. The output from the balanced modulator is thus Fo−Fi and Fo+Fi, and this is applied as one input to the balanced mixer 16. The other input to 16 is that of the received signal which is, of course, the original transmitted frequency plus the beat frequency, i.e. Fo+Fb. The mixing process at 16 results in there being produced a voltage Fi+Fb and Fi−Fb. In other words, the output from balanced mixer 16 is the IF oscillator frequency plus side bands and this is fed to the amplifier.

The second mixer 2 has applied to it the oscillations from the sweep generator 3 and the output from the balanced detector BD. The object of the sweep oscillator is to sweep across the mixers with the object of producing an output which is a function of the beat frequency which is developed in the balanced detector BD, and is applied as one input to the mixer, and, of course, the original sweep oscillator frequency. The output of this mixer is applied to the delay line DL which delays the signals from the different heads which are applied to the delay line through their respective mixers so that the signals from these mixers are applied to the output filter 7 in the correct time sequence. By this means a plurality of separate signals may be received during any given pulse repetition period. The significance of this arrangement is that if DL were not employed a large part of the pulse repetition period would be unused because the range information may well be provided in one short period representing a very small fraction of the pulse repetition period. However, owing to the use of the sweep oscillation generator 3 the voltage applied to the mixers 2 sweeps across these so that the series of signals from the heads are suitably delayed to provide the discrete signals at the correct time sequence at the filter 7.

The outputs from the detectors BD (of which there are N), are as heretofore explained mixed in mixers 2 (of which there are also N) with outputs from a sweep oscillator 3 and fed to different taps on a delay line DL which is so designed and the taps on which are so chosen that the resultant signals corresponding to adjacent heads arrive at the end of the line delayed by periods $$\frac{1}{Nf_r}, \frac{2}{Nf_r}, \frac{3}{Nf_r} \ldots$$

and so on, where $f_r$ is the transmitter repetition frequency. The various inputs for the mixed resultants to the line DL are indicated at $DL_1$ $DL_2$ $DL_3$ . . . $DL_N$.

The sweep oscillator 3 has a frequency deviation of $N(f_1-f_2)$ where $f_1-f_2$ is numerically equal to $f_a-f_b$ and which is synchronized by the time base 14 being actually controlled from unit 14a. It is assumed here that the oscillator 3 is not amplitude modulated. If desired, however, and preferably, the sweeping oscillator may be amplitude modulated though whether or not such modulation is used is entirely a matter of design choice since the modulation may be purely frequency and the individual oscillations may be all of the same amplitude. However certain advantages (and disadvantages) are obtained if the sweeping oscillator amplitude is caused to fall away smoothly, preferably in accordance with a cosine squared law, from a maximum at the middle of the frequency sweep to minima at the beginning and end. The output from the delay line DL is passed through a filter 7 to a dispersive network and including the tapped delay line 8 and filters $F_1, F_2$ . . . . In the embodiment now being described it is assumed that the filter 7 is a sum frequency filter though it will be understood that the filter 7 might be a difference frequency filter or might pass both sum and difference frequencies. The delay interval between adjacent taps on the line 8 is $$\frac{1}{N(f_2-f_1)}$$

the filters having a pass band $f_r$ c./s. wide and being separated by a frequency interval (between adjacent filter center frequencies) equal to the transmitter repetition frequency. A typical dispersive spectrum analyzer means for the system is enclosed in a dotted line box 18 of Fig. 1.

Display of targets picked up by the system is effected by a display tube 6 which is fed from the unit 14 with a time base co-ordinate of deflection at N times the transmitter repetition frequency $f_r$ and is also fed from the time base 14a with a perpendicular co-ordinate of deflection at the transmitter repetition frequency $f_r$. The ray in the tube is brightened up by means of output signals from the dispersive network which signals are fed to the control electrode (not separately shown) of the tube after rectification by the rectifier 9.

With this arrangement it will be seen that the deviation of the sweeping oscillator 3 is so adjusted that the relevant range is swept through in 1/Nth of the transmitter repetition frequency $f_r$ and the mixed resultants of the outputs from the N heads are so delayed that signals from adjacent heads are subjected to delays which differ by 1/Nth of a transmission cycle. Accordingly a sequence of N range sweeps from the heads is produced in time sequence in one transmitter period. This is conventionally represented in Fig. 2 (a) (b) and (c) in which (a) represents the output from one head, (b) represents the delayed outputs from a plurality of heads (four are represented) and (c) represents the combination of the delayed outputs represented at (b). Throughout Fig. 2 one transmission period is indicated by the time dimension TP and the time delays imposed on the various head outputs are indicated in Fig. 2 (b) by the time dimensions DT2, DT3, and DT4. Thus because of the adjustment of the deviation of the sweeping oscillator to be N times the relevant beat note range there is obtained a resultant time sequential display which only lasts 1/Nth of each transmission cycle. The outputs from the spectrum analyzers associated with the different heads (one with each) are displayed in proper sequence. Thus each of the signals shown in sequence at (c) in Fig. 2 is fed in turn to filter 7 and delay line 8, where it is delayed by a time equal to the delay between the input of the delay line and the filter whose pass band includes the frequency of the particular signal. The output of this filter is then rectified by rectifier 9 and the resulting output applied to increase the intensity of the ray of display tube 6. As the input signals applied to filter 7 are the signals derived from each receiver head in turn, occurring at a frequency of $Nf_r$, and the display tube 6 is scanned horizontally at a frequency of $Nf_r$ and vertically at a frequency of $f_r$, then the particular horizontal scan on which an indication is shown defines the receiver head, and therefore the azimuth, from which the target information is obtained. The particular position of the indication along the horizontal scan is dependent upon the delay experienced by the signal in delay line 8, and is therefore a measure of the range of the target.

Clearly the invention is not (theoretically) limited as to the number of heads employed and the number actually employed in any particular installation will be chosen in the light of practical cinsiderations.

The filter 7 can, if desired, be arranged to pass both the sum and difference frequencies produced by mixing. If this is done the pulses fed to the rectifier 9 will be duplicated, the pulses of each pair being symmetrically disposed each side of the pulse due to the sweep frequency. In such a case a so-called triangular form of time base wave—i.e. a wave form which rises linearly from minimum to maximum and then returns to minimum at a rate of fall equal to the preceding rate of rise—may be applied between the horizontal deflection plates of the display tube to ensure that the pulses in successive halves of each double train are superimposed in display because the time base deflection is in one direction in one half and the opposite in the other. As the arrangement employing a triangular form of time base wave forms per se no part of the present invention it needs no further description herein but, for more detailed information, attention is directed to the co-pending application No. 385,830 filed on October 13, 1953 and in particular to the description relating to Figs. 9 and 10 thereof.

As already explained in co-pending application No. 385,830 the frequency produced from an input train of frequencies by frequency modulating (mixing) it with the output from the saw tooth frequency modulated oscillator 3 changes with time linearly at a constant rate and it is also shown in that application that the resultant output pulse from mixer 2 for any input frequency will have a width of the order of the reciprocal of the deviation of the oscillator 3 and will be in shape approximately a $$\frac{\sin x}{x}$$

pulse with the main "side lobes" (those next on either side of the main peak) of somewhere about 20% of the main peak amplitude as a rule. This form of pulse is not always convenient since the side lobes make it difficult to distinguish, when displayed, from other smaller pulses due to closely adjacent input frequencies and therefore occurring at closely adjacent times. A better form of pulse can be obtained by amplitude modulating the sweep oscillator 3 (for example, preferably in accordance with a cosine squared law) so that the middle frequency of the sweep is of maximum amplitude, the amplitude falling away smoothly to zero or nearly so at the beginning and end of the frequency sweep. A much better shape of pulse, with much smaller side lobes is obtained if this is done, the resultant pulse being wider and with few and smaller side lobes. If amplitude modulation of this nature is used the deviation must be doubled (as compared to the value used in the case of a constant amplitude oscillator 3 to give the same resolution over the same band analyzed.

The invention is not limited to the display of targets in terms of azimuth and range for obviously, by suitable construction of the heads and receivers in manner that will be apparent to those skilled in the art from the description already given targets may be displayed in terms of other factors, for example azimuth and altitude, or range and velocity . . . and so on as already mentioned herein. For example, the receiver heads instead of each being adapted to scan a predetermined volume of space may be arranged so that each scans the total volume and is adapted to select and pass a particular range of Doppler frequencies, the actual range being different for each receiver head. In this way the system is capable of indicating a velocity as well as range.

While we have described our invention in certain preferred embodiments we realize that modifications may be made and we desire that it be understood that no limitations upon our invention are intended other than may be imposed by the scope of the appended claims.

We claim:

1. A radar system comprising at least one frequency modulated transmitter adapted to transmit continuous waves which are frequency modulated in accordance with a predetermined periodic law repeating itself at a predetermined repetition frequency, a plurality of differently directed receiver heads each covering a different portion of a volume in space to be "watched," a mixer individual to the output of each of said receiver heads, a sweep oscillator, means connecting said sweep oscillator with each of said mixers for producing in each of said mixers a beat frequency corresponding to the difference between the signal frequencies incident upon said receiver heads and the frequency of said sweep oscillator, a delay line common to the outputs of all of said mixers, a dispersive filter network having an input and output system, means for impressing the output of said delay line upon the input system of said dispersive filter network, a cathode ray display tube, control means for said tube, means for deflecting the cathode ray in said tube in one direction at a frequency corresponding to the predetermined repetition frequency of said transmitter, means for deflecting the cathode ray in said tube in another direction at a frequency equal to a multiple of said predetermined repetition frequency and means for applying signals derived from said dispersive filter network to said control means for said display tube.

2. A radar system comprising a transmitter, a saw tooth modulator for frequency modulating said transmitter at a predetermined repetition frequency between predetermined frequency limits, a time base controlling said modulator and operating at said repetition frequency, a frequency divider, a master time base operating at a multiple of said repetition frequency, means for impressing energy from said master time base upon said modulator through said frequency divider and said first mentioned time base, a plurality of receiving heads differently oriented in azimuth and each comprising a circuit including a receiving aerial, a balanced mixer, a balanced modulator, an intermediate frequency oscillator and a balanced detector, means for feeding one input to said balanced mixer from said receiving aerial, means for feeding another input to said balanced mixer from said balanced modulator, means for impressing one input on said balanced modulator directly from said transmitter, and another input on said balanced modulator from said intermediate frequency oscillator, said balanced detector receiving one input from said intermediate frequency oscillator and the other input from said balanced mixer, a sweep oscillator synchronized in operation by said master time base, a mixer individual to the output of each of said balanced detectors and excited from said sweep oscillator, a delay line having a multiplicity of taps thereon, each fed with the output of one of said mixers, a dispersive network fed with the output from said delay line, a cathode ray display tube having pairs of control plates therein, one set of said control plates being connected with said master time base and the other set of said control plates being connected with said first mentioned time base, control means in said cathode ray display tube, a rectifier in circuit with said control means, and means connecting the input through said rectifier with said dispersive network.

References Cited in the file of this patent
UNITED STATES PATENTS

| | | |
|---|---|---|
| 2,433,332 | Benioff | Dec. 30, 1947 |
| 2,508,400 | Kiebert | May 23, 1950 |